United States Patent [19]

Tarlow et al.

[11] Patent Number: 4,683,812
[45] Date of Patent: Aug. 4, 1987

[54] TEA BREWER AND DISPENSER COMBINATION

[75] Inventors: Kenneth A. Tarlow, Playa del Rey, Calif.; Brad Ridgley, 16881 Oak View Dr., Encino, Calif. 91436

[73] Assignee: Brad Ridgley, Encino, Calif..

[21] Appl. No.: 866,607

[22] Filed: May 23, 1986

[51] Int. Cl.⁴ .......................... A47J 31/18; A47J 31/40
[52] U.S. Cl. .................... 99/289 R; 99/295; 99/306; 222/169; 222/367
[58] Field of Search ............. 99/289 R, 289 D, 289 P, 99/290, 279, 286, 291, 295, 299, 300, 302 R, 304, 306, 317, 323; 426/433; 222/169, 170, 367, 282

[56] References Cited

U.S. PATENT DOCUMENTS

| | | |
|---|---|---|
| 1,273,012 | 7/1918 | Souther . |
| 1,656,980 | 1/1928 | Kronke . |
| 1,723,211 | 8/1929 | Schmidt .............................. 222/367 |
| 2,255,158 | 9/1941 | Furrier . |
| 2,956,711 | 10/1960 | Mortara .............................. 222/170 |
| 3,018,924 | 1/1962 | Reed . |
| 3,115,993 | 12/1963 | Ludwig . |
| 3,258,174 | 6/1966 | Mullen . |
| 3,606,829 | 9/1971 | Alwood ................................ 99/306 |
| 3,631,793 | 1/1972 | Bednartz ............................... 99/295 |
| 4,300,442 | 11/1981 | Martin ............................... 99/289 R |
| 4,545,296 | 10/1985 | Ben-Shmuel ...................... 99/289 P |

Primary Examiner—Robert W. Jenkins
Attorney, Agent, or Firm—Poms, Smith, Lande & Rose

[57] ABSTRACT

A combination tea dispenser and brewer wherein a variety of different teas are provided in individual dispensers which are located in a position to dispense tea into an area where the dispensed tea is contacted by boiling water to brew the same. The brewed tea falls into a pot on the dispenser and is ready to be served.

17 Claims, 14 Drawing Figures 4,683,812

TEA BREWER AND DISPENSER COMBINATION

BACKGROUND OF THE INVENTION

1. Field of the Invention

The invention relates to tea brewing devices; and, more particularly, to a combination tea dispenser and brewer therefor.

2. Description of the Prior Art

Teapots are, of course, well known in the art. Such pots may be used with tea strainers in which tea is placed, then the strainer is placed in the pot and boiling water is poured thereover to steep the tea. In recent years, there has been a great interest in herb teas and other types of teas. Of course, such teas must be individually brewed. If someone desired to brew such teas, they must select the type of tea, fill the strainer, boil water, then pour the boiling water over the strainer containing the tea.

In recent years, coffee making machines have attained a great deal of popularity. Such machines are time savers and brew coffee in one pot where the coffee is heated to a proper brewing temperature. No such labor saving device exists for teas.

There is thus a need for a device that can store differing teas, then be used to select one of the teas, or a combination of different teas, and brew the same in a pot.

SUMMARY OF THE INVENTION

It is an object of this invention to provide a combination tea dispenser and brewer therefor.

It is a further object of this invention to provide a combination tea dispenser and brewer therefor which can hold and selectively dispense a variety of differing teas, or a combination of different teas.

It is still another object of this invention to provide a combination tea dispenser and brewer therefor where boiling water is automatically delivered into contact with the tea to brew the same.

These and other objects are preferably accomplished by providing a combination tea dispenser and brewer wherein a variety of different teas are provided in individual dispensers. The dispensers are located in a position to dispense tea, one type at a time, or a combination of different types, into an area where the dispensed tea is contacted by boiling water to brew the same. The brewed tea falls into a pot on the dispenser and is ready to be served.

DESCRIPTION OF THE PREFERRED EMBODIMENT

Figure 1:
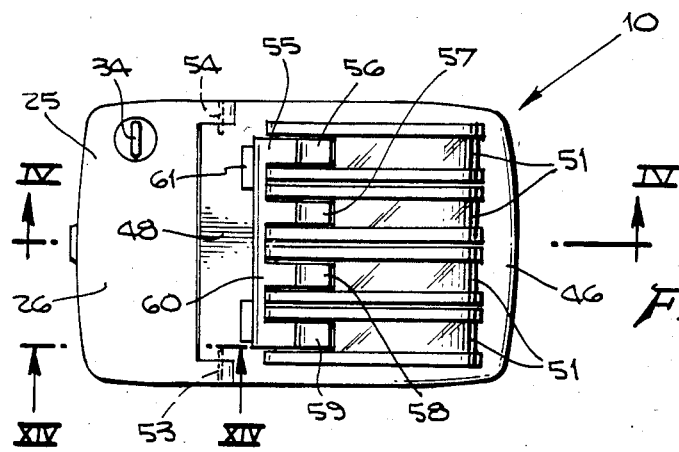
FIG. 1 is a top plan view of a tea dispenser and brewer combination in accordance with the teachings of the invention.
Figure 2:
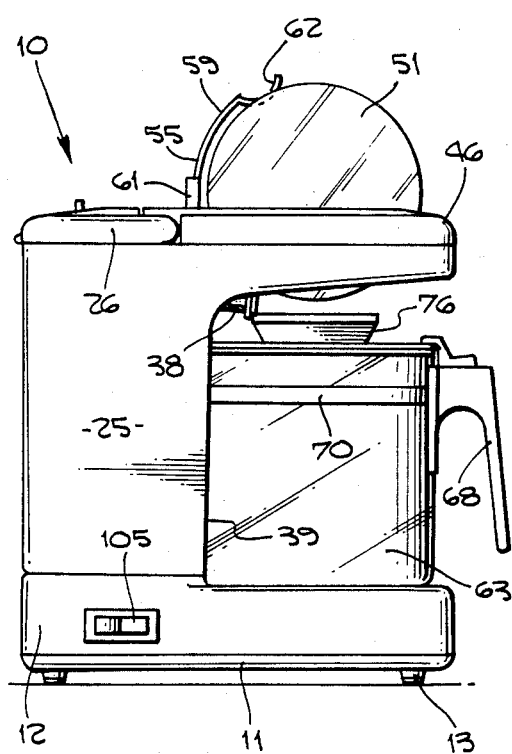
FIG. 2 is a side vertical view of the combination of FIG. 1.
Figure 3:
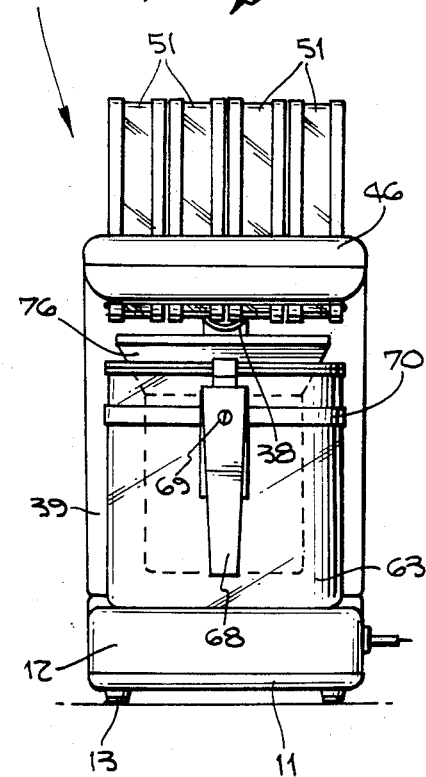
FIG. 3 is a front vertical view of the combination of FIGS. 1 and 2.

Referring now to FIGS. 1 to 3 of the drawing, a tea dispenser and brewer combination 10 is shown having a lower base 11 (FIG. 4) secured to an upper base 12. A plurality of support legs 13, preferably of a resilient material such as rubber, may be secured in any desired manner at spaced locations to the undersurface of lower base 11. A carafe support plate 14, of any suitable heat resistant material, such as stainless steel, is mounted within upper base 12. A conventional heating element 15 (FIG. 13) is mounted internally of upper base 12 below plate 14 and in contact therewith for heating the same.

Figure 13:
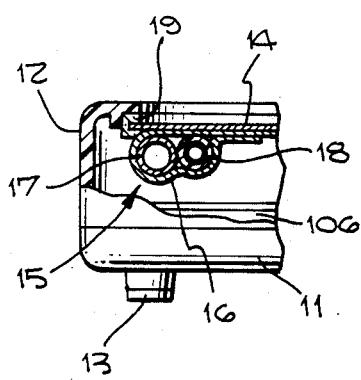

As seen in FIG. 13, heating element 15 may comprise a curved flange 16 retaining therein a water tube 17 and a heating conduit 18 (FIG. 6). plate 14 is retained in a heat resistant ring 19 mounted to upper base 12 as shown in FIG. 13. Tube 17 includes a first portion 20, FIG. 4, leading from flange 16 to a connector tube 21, such as a silicone tube, then to a water pipe 22. Water pipe 22 passes through an opening 23 in a boss 24 of a partition wall 29 forming the upper wall of upper base 12.

Figure 5:
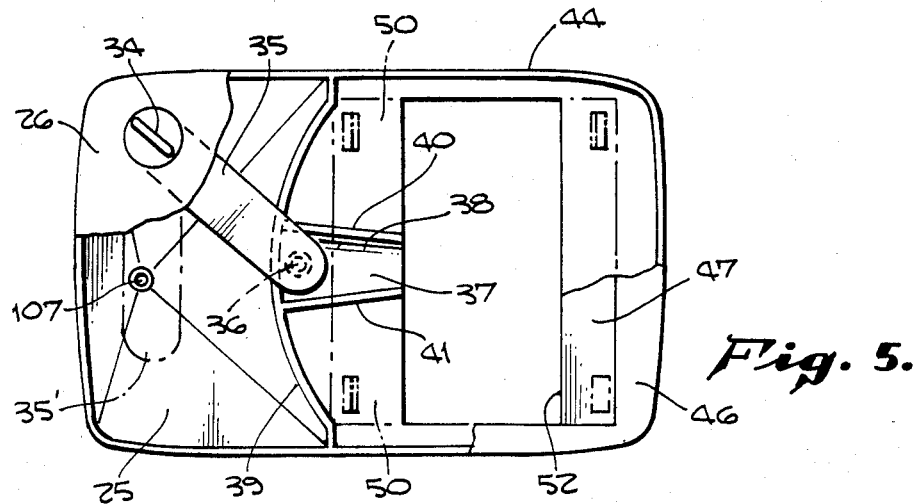
FIG. 5 is a view taken along lines V—V of FIG. 4.
Figure 4:
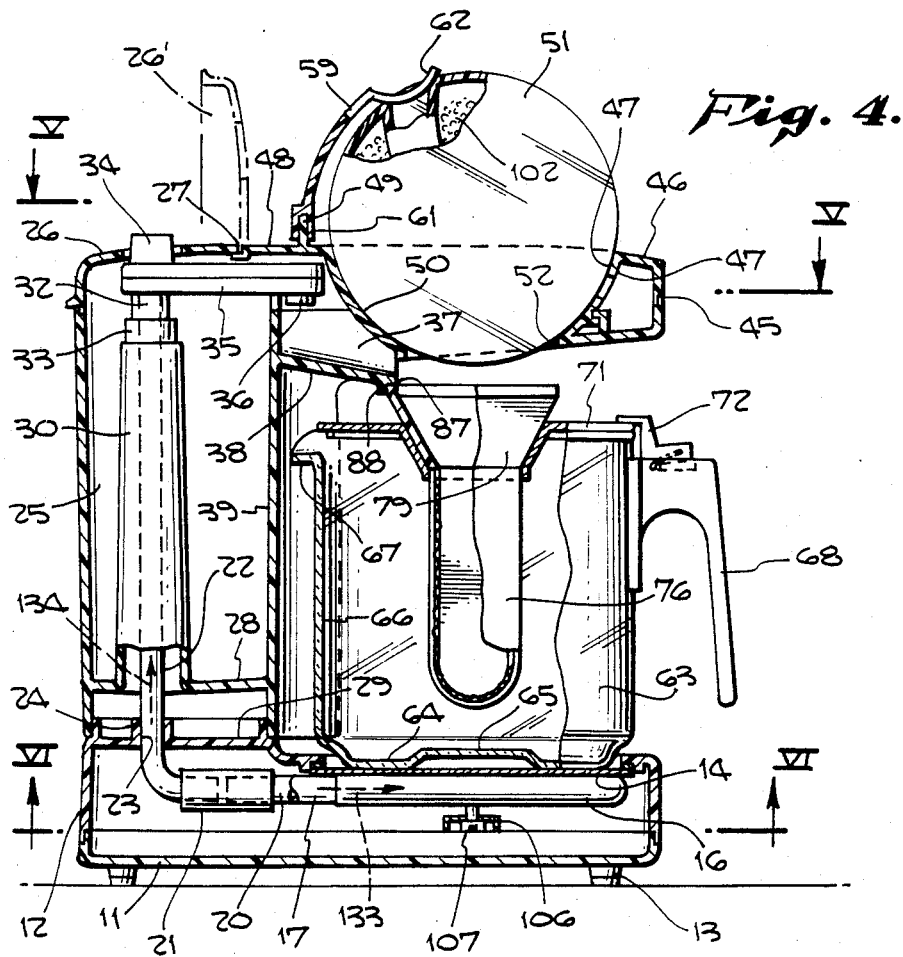
FIG. 4 is a side vertical view, partly in section, of the combination of FIGS. 1 to 3, taken along lines IV—IV of FIG. 1.
Figure 12:
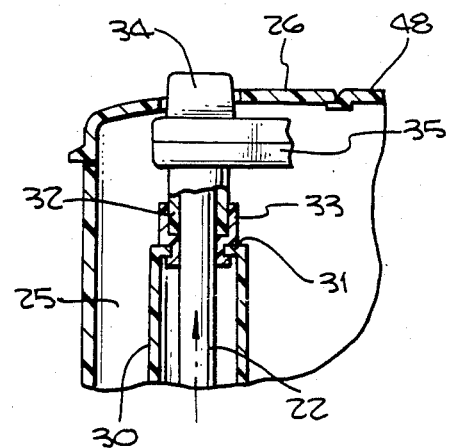
FIGS. 12 and 13 are detailed sectional views of portions of the combination of FIGS. 1 to 6.

Combination 10 includes a water tank 25, snap fitting or the like onto base 12, closed off at the top by a lid 26. Lid 26 is pivotally connected at pivot point 27 and pivots to the dotted line position 26'. A partition wall 28 is provided in tank 25 spaced from wall 29 and a hollow post 30, opening at the bottom below wall 28, extends vertically upwardly from wall 28. As seen in FIG. 12, post 30 terminates at the top in an inwardly extending flange 31 receiving therein a spout insert portion 32 retained thereon by a connector 33, such as a silicone sleeve. It can be seen that water pipe 22 extends into insert portion 32 and insert portion 32 is rotatable about pipe 22. Insert portion 32 is internally connected to a lever or button 34 (See also, FIG. 1) extending out of the lid 26. Button 34 can be grasped manually and turned to turn insert portion 32. Insert portion 32 is also integral with a spout 35 having a portion 36 opening into an expansion chamber 37 (FIG. 4). As seen in FIG. 5, and as will be discussed further hereinbelow, spout 35 can be rotated away from expansion chamber 37 to the dotted line position 35' by manually rotating button 34.

Expansion chamber 37 is provided with a ramp 38 extending from wall 39 of tank 25 and closed off on each side by vertical walls 40, 41 (See FIG. 5).

As seen in FIG. 5, water tank 25 is part of the housing of combination 10 and a peripheral wall 44 extends from wall 39 terminating along the front in a front wall portion 45 (see FIG. 4) having an integral top flange or wall portion 46 having an inwardly and downwardly sloped wall portion 47. Lid 26 is pivotally connected as at pivot pins 53, 54 (FIG. 1) to a top wall portion 48 having a pair of upwardly extending flanges 49 (only one visible in FIG. 4) and a downwardly sloped wall portion 50. Sloped portions 47 and 50 form a cradle for one or more cylindrically shaped tea dispensers, such as dispenser 51 in FIG. 4, as will be discussed. Sloped portions 47 and 50 form an opening 52 (See also, FIG. 5) in combination 10 opening to a carafe section of the combination 10.

As seen in FIG. 4, a dispenser-opening retention plate 55 (See also, FIG. 1) is provided having a plurality of resilient fingers, such as spring steel fingers 56 to 59 (FIG. 1), coupled to a manifold portion 60 having a pair of U-shaped flanges 61 (FIGS. 1 and 4) snap fittings onto spaced flanges 49. Each finger 56 to 59 terminates in a curved end portion 62, for reasons to be discussed, overlying and abutting against dispensers 51 (See also FIG. 1 and 2).

As seen in FIG. 4, a carafe 63, preferably of transparent heat resistant material, having a lower wall 64 with a countersunk portion 65 is provided disposed on top of plate 14. Carafe 63 includes a peripheral side wall 66 integral with bottom wall 64 having a spout 67 on one side and a handle 68 on the other. Handle 68 may be secured to carafe body 66 in any suitable manner, such as by a screw 69 or the like (FIG. 3), secured to a band 70 surrounding the upper portion of wall 66. A lid or cover 71 closes off the open upper end of carafe 63 and is integrally attached to a spring biased push button 72 as is well known in the art.

Figure 11:
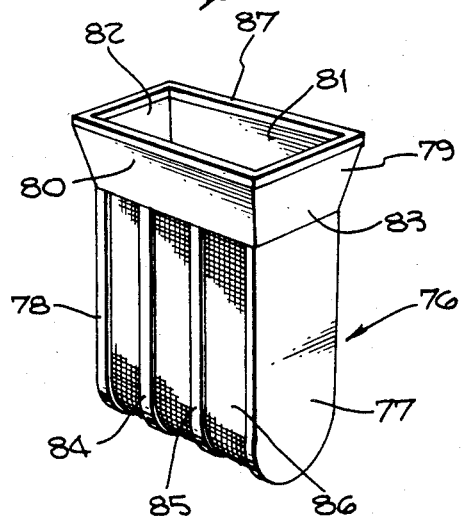
FIG. 11 is a perspective view of another element of the combination of FIGS. 1 to 6 removed therefrom for convenience of illustration.

As seen in FIG. 4, lid 71 includes a downwardly sloping peripheral wall 74 forming an opening 75 leading into the interior of carafe 63. As seen in FIG. 11, a filter 76 is provided for insertion into opening 75. Thus, opening 75 may be oblong or otherwise configured to receive filter 76 therein. Of course, filter 76 may be of any suitable configuration (along with opening 75), but preferably elongated to cover a substantial portion of the lateral extent of opening 52 for reasons to be discussed.

Filter 76 includes a pair of spaced side walls 77,78 having a trough-shaped top 79. Top 79 is open at the top and walls 77,78 are integral with and extend vertically downwardly from opposite ends thereof as shown. Top 79 thus includes front and rear walls 80,81, respectively, and interconnected side walls 82,83, respectively. A pair of spaced strengthening ribs 84,85 are also provided between side walls 77, 78 and a mesh 86 closes off the interior of filter 76. Mesh 86 is preferably of a permanent washable material, such as nylon mesh, so no additional filter material is necessary. As seen in FIG. 4, filter 76 fits snugly into wall 74 and opening 75 therein with its upper peripheral lip portion 87 abutting against a flange 88 on the undersurface of ramp 38 to align carafe 63 and filter 76 with the ramp 38 and opening 52.

Figure 7:
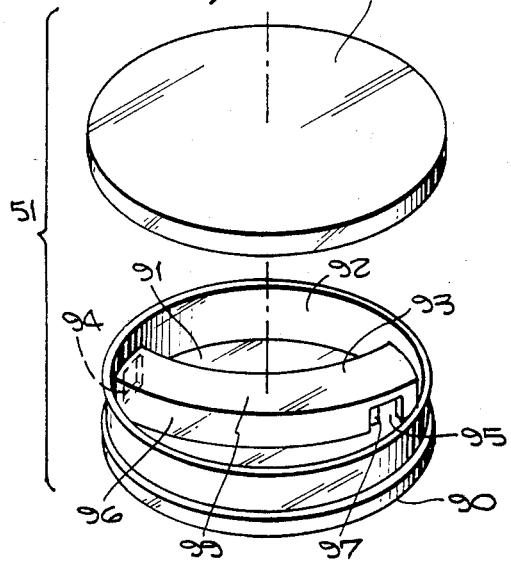
FIG. 7 is an exploded view of one element of the combination of FIGS. 1 to 6 removed therefrom for convienience of illustration.
Figure 9:
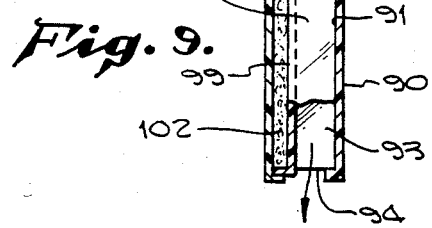
FIG. 9 is a view taken along lines IX—IX of FIG. 8.
Figure 8:
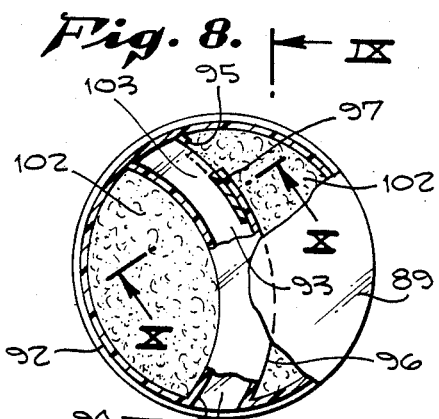
FIG. 8 is a section view of the assembled element of FIG. 7 in operative position.
Figure 10:
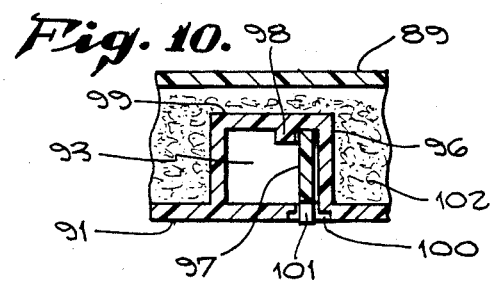
FIG. 10 is a view taken along lines X—X of FIG. 8.

One of the dispensers 51 is shown in exploded view in FIG. 7. Each dispenser is preferably cylindrical and includes a lid 89 closing off a main body portion 90. Main body portion 90 includes a lower wall 91 and an integral peripheral wall 92. Lid 89 is adapted to snap fit onto main body portion 90 and close off the same in an air tight manner. Main body portion 90 is provided with a curved inner chamber 93 extending from one portion of the inside of peripheral wall 92 to another portion thereof. As seen in FIG. 8, an opening 94 is provided in wall 92 communicating with the interior of chamber 93. Also, as seen in FIG. 7, an opening 95 is provided in chamber 93 in one of the side walls, such as wall 96, thereof. As seen in FIG. 10, chamber 93 is preferably U-shaped in cross section and a gate 97 is provided on the interior thereof against the inside of wall 96 and retained thereto by a lip or flange 98 extending along a portion of the inside of the top wall 99. As seen in FIG. 10, a slotted opening 100 is provided along a portion of bottom wall 91 with a nub 101 or the like integral with gate 97 extending out of slot 100. Nub 101 (See also FIG. 9) may be roughened and is adapted to be pushed or the like along slot 100 which also moves gate 97 to selectively open and close opening 95 (See also FIG. 8).

The foregoing divides the interior of dispenser 51 into two chambers, a tea containing chamber and a tea dispersing chamber. Thus, tea leaves 102 may be disposed loosely in dispenser 51 on all sides of chamber 93 with gate 97 in the normally closed position. When it is desired to dispense the tea leaves, gate 97 is slid open via nub 101 allowing tea leaves to enter opening 95, as indicated by arrow 103 in FIG. 8, to be dispensed out of opening 94, as indicated by arrow 104, into filter 76 when dispenser 51 is in the FIG. 8 position (i.e., with opening 94 down and in fluid communication with filter 76).

A switch 105 (FIG. 2) is provided on the exterior of wall 12 for operating combination 10. Electrical conduit 121, 122 (FIG. 6) are also provided extending from the internal electrical components to a plug (not shown).

Figure 6:
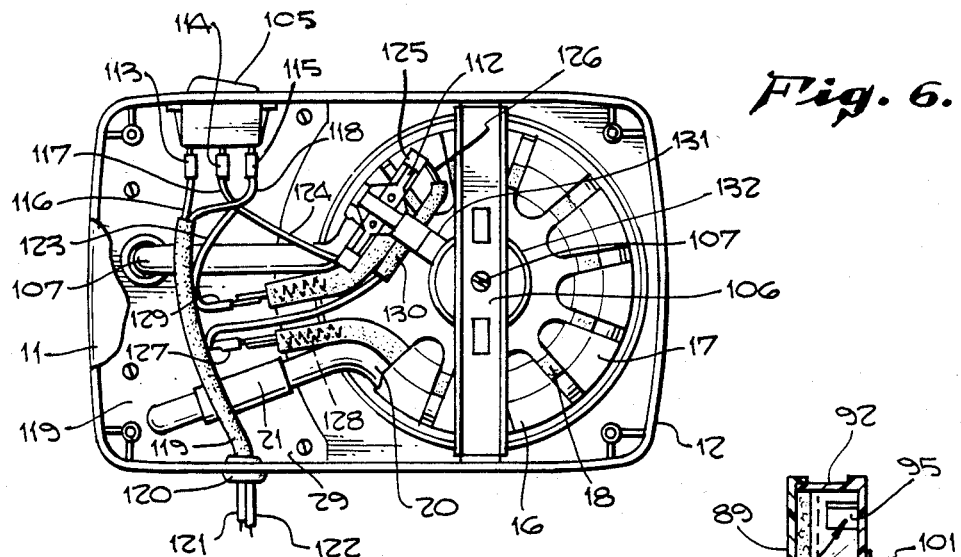
FIG. 6 is a view taken along lines VI—VI of FIG. 4.
Figure 14:
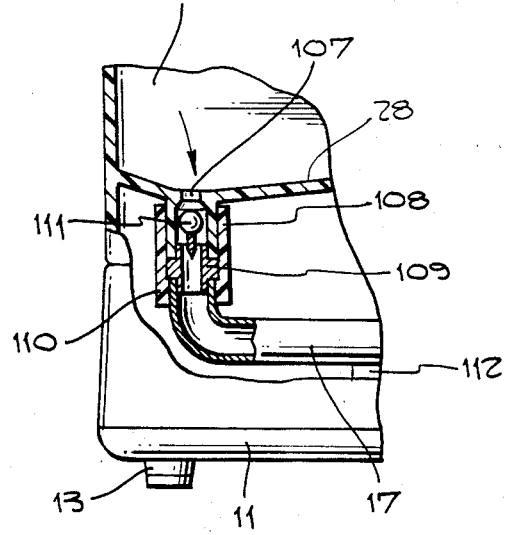
FIG. 14 is a view taken along lines XIV—XIV of FIG. 1.

As seen in FIGS. 6 and 13, a cross brace 106 (FIG. 6) extends across the undersurface as also seen in FIG. 4 and is secured, via screw 107, to both a circular support plate 132 and to plate 14. As seen in FIG. 14, tube 17 extends around within flange 16 to the side of combination 10 opposite that shown in FIG. 4 where it reenters water tank 25 at opening 107. Opening 107 includes an integral downwardly extending boss 108 (FIG. 14) receiving therein a valve housing 109 coupled to tube 17. A silicone tube 110 surrounds boss 108 and valve housing 109. A conventional one way ball valve 111 may be mounted in housing 109 to control fluid flow out of tank 25 as is well known in the art. The ball of valve 111 is adapted to seat in valve 111 as shown permitting fluid flow therepast while moving upwardly to seal opening 107 to prevent water backflow. A conventional thermostat 112 (FIG. 14) engages tube 17 to monitor fluid therein. Any suitable thermostat may be used.

Referring now to FIG. 6, push button 105 includes three receptacles 113 to 115 receiving therein connectors on button 105 as shown. Electrical conduits 116 through 118, respectively, lead from receptacles 113 to 115, respectively. Conduit 116 leads through a sheath 119 and out of bushing plug 120 in the housing wall to the aforementioned conduit 121. Conduit 118 also leads through sheath 119, out plug 120 to conduit 122. Both conduits 121,122 extend to the aforementioned plug and, of course, each set of conduits 116, 121 and 118, 122 may be one integral conduit. Conduit 117 branches off into conduits 123 and 124.

Thermostat 112 is disposed in a receptacle 125 coupled via conduit 126 to a connector 127 coupled to heating coil 128 within heating conduit 18. At the opposite end, coil 128 is coupled, via connector 129 to conduit 123. Conduit 124 is coupled to thermostat 112 at receptacle 125. A sheath 130 surrounds conduit 126 and contains therein a conventional thermostat cut-off switch (not visible). A thermostat pressure plate 131 is coupled to thermostat 112 and to a circular support plate 132 supported by cross brace 106. Thus, the entire heating apparatus is supported within the housing by cross brace 106. Heating coil 128 may be of any suitable type, such as a 750 watt, 120 volt heater. Suitable materials, such as plastic, stainless steel, etc. may be used throughout. For example, the water storage tank may be made of celcon or kemetal, a highly crystalline synthetic material known for its taste-free, non-toxic qualities.

In operation, lid 26 is opened and a predetermined amount of water is poured into water tank 25. One of the tea dispensers 51 is selected, (or a combination of different teas from one or more dispensers 51) depending on the tea desired (the dispenser 51 being in the FIG. 2 position with curved finger 62 bearing against and closing opening 94 therein). The gate 97 is located at a predetermined open position for dispensing the amount of tea leaves desired. The dispenser 51 is rotated and tea leaves are dispensed out of opening 94 and into filter 76 during such rotation, a complete rotation being sensed by the re-engagement of finger 62 in opening 94.

The filter 76 is of course disposed in carafe 63 and the carafe is on plate 14 with the spout 67 oriented as shown in FIG. 4. Thus, ramp 38 is aligned with the filter 76 by the abutment of lip 87 thereof with flange 88. The spout 35 is in the solid line position of FIG. 5.

The switch 105 is now activated which switches on the heating plate 14 and begins to heat the water in tank 25 which enters opening 107 (FIG. 14); through valve 111 and through water tube 17 (FIG. 4) in the direction of arrow 133 and when boiling, exists out tube section 20 up into water pipe 22 to spout 35 as indicated by arrow 134. The heated water flows out of spout portion 36, down ramp 38 and into filter 76 where it contacts the tea leaves therein as is well known in an impulse heating system. The mesh 86 retains the water and tea therein steeping the tea leaves with the steeped tea dripping or filtering down into carafe 63. Tank 25 holds an amount of water equivalent to the volume of the carafe 63. Thus, spout 35 may be left in the solid line position of FIG. 5 to heat and dispense the entire contents of tank 25. Alternatively, if the user desired to stop the flow of hot water at any time before all the water is dispensed out of tank 25, as, for example, to brew one cup of tea at a time directly into a cup, or to remove the carafe, then button 34 is manually turned to move spout 35 to the dotted line position in FIG. 5 so that any water therein flows or drips back into water tank 25. The handle 68 is used to remove carafe 63 from plate 14 and the filter 76 may be easily removed and the steeped leaves disposed of. The tea is poured out of spout 67 and lid 71 may be lifted, if desired, via button 72. The tea in carafe 63 may be kept warm by returning it to its FIG. 4 position on plate 14.

The thermostat 112 and cut-off therefore controls the heating of the water in tube 17 via heater 128 as is well known in the art. Thus, the water is heated to a desired tea leave steeping temperature, dispensed into contact with the tea leaves while warming plate 14. The area within chamber 37 acts as an expansion chamber to smooth out the flow of impulse hot water into filter 76 thereby accomplishing in a small area what other devices accomplish over a much greater area. The resilient arm portion 62 seals the opening 94 in each dispenser 51 to make it air tight and selective dispensers may be chosen to dispense different teas. The gate 97 may be fully opened, or partially opened to adjust the amount of tea leaves dispensed. Suitable indicia may be provided for accomplishing this along with suitable stop means on the gate 97 and the wall 96, such as mating raised protrusions, to accomplish the same.

There is thus disclosed a tea dispenser and brewer therefor which can be used to store a number of different kinds of tea leaves in an air tight manner, then allow selective ones of such leaves, or combinations thereof, to be dispensed into a filter in a pot where the leaves are contacted by boiling water to steep the leaves, the steeped tea filtering into a carafe. The carafe is kept warm during and after such steeping and the spout used to introduce the boiling water into the filter can be moved to a position where dripping water re-enters the water reservoir tank rather than dripping down into the filter. The filter can be removed after brewing without the need for removing the disks or opening the pot cover.

The disks make the device as convenient and easy to use as a tea bag with the superior flavor of fresh brewed tea and cost savings over conventional tea bags. The teas are stored in an air-tight manner and the disks can be precisely and easily adjusted to dispense different grades of tea. In fact, the dispensers can contain any suitable spices and powders of all types of consistency so that many combinations thereof can be blended.

The sealing arms 59 guide each disk to its resting position and seal the openings therein in an air-tight manner. The mesh filter can be easily removed when desired thus controlling the strength of the tea and can be returned to the pot to make even stronger tea. Thus, one or more cups can be poured of one strength, then the filter returned for longer steeping and stronger cups.

The device dispenses hot water in an immediate and constant flow just as it attains the right brewing temperature (preferably, just below boiling). The heating and dispensing of the hot water is synchronized with the gradual infusion of tea.

Each disk can store about 30 servings of herbs and teas, all stored in an air-tight environment, and each being removable and interchangeable so that other disks may be substituted. The built-in slide gate of each disk can be adjusted to control the precise amount of tea being dispensed, the disk easily rotated to dispense the same. The sealing arms guide the disks back to their original resting position and seals the opening. The disks may be marked with suitable indicia, such as changeable labels, to identify the contents and are easy to open and close for cleaning and re-filling.

I claim:

1. A combination tea brewer and tea leaves dispenser comprising:
    a housing having a bottom wall and a peripheral side wall with an opening in the side wall;
    a heating plate disposed in said housing within said opening for receiving a carafe thereon;
    a water tank within said housing having an outlet leading to a water pipe within said housing, said water pipe being disposed below said heating plate and adjacent thereto and having an outlet leading upwardly within said housing to a water spout;
    said water spout opening into the interior of said opening in said side wall about said plate;
    heating means engaging said water pipe for heating water flowing therethrough;
    a tea dispenser retaining area in said housing above the opening in said side wall having an opening therethrough communcating with the interior of the opening in said side wall;
    at least one tea dispenser disposed in said area adapted to contain tea leaves therein, said dispenser having an opening therethrough communicating with the interior of said dispenser; and;

at least one dispenser opening closure member on said housing engaging said dispenser and normally closing off the opening in said dispenser whereby disengagement of said closure member from said opening in said dispenser opens the interior of said dispenser to the atmosphere.

2. In the combination of claim 1 wherein said housing includes a top wall and said closure member is a rigid arm fixedly to the top wall of said housing having a resilient curved finger conforming to the opening in said dispenser and normally overlying the same adapted to enter said opening in said dispenser to seal off the same from the atmosphere.

3. In the combination of claim 1 wherein said dispenser is cylindrical and said area is curved so that said dispenser may be vertically disposed within said area, resting thereon, then rotated in said area.

4. In the combination of claim 1 wherein a plurality of dispensers are provided in said area, each of said dispensers having their respective openings sealed off by a closure member fixed to said housing.

5. In the combination of claim 1 wherein said dispenser includes an internal chamber communicating at one end with the opening in said chamber and sealed at its other end, said chamber being closed off from the remaining interior of said dispenser except at said opening in said dispenser, said chamber having gate means thereon for selectively opening the interior of said chamber to the remaining interior of said dispenser.

6. In the combination of claim 5 wherein said gate means includes an opening through one wall of said chamber and a gate slidable along said wall with a portion thereof accessible from the exterior of said dispenser for selectively opening and closing said gate.

7. In the combination of claim 6 wherein said gate means includes means for adjusting the size of the opening thereof.

8. In the combination of claim 1 including a vertical hollow post in said water tank with said pipe extending upwardly therethrough to said spout, said spout including a spout insert rotatably mounted in said post whereby said spout may be rotated from a first position opening into the interior of the opening in said side wall to a second position opening into the interior of said tank.

9. In the combination of claim 8 including a lid hingedly mounted to said housing normally closing off the top of said water tank and a button engaging said spout for rotating said spout away from its first position to its second position.

10. In the combination of claim 1 including a water expansion chamber in said housing below said dispenser area in fluid communication with said spout and said opening in said side wall.

11. In the combination of claim 10 wherein said expansion chamber includes a ramp leading from said water tank to a point below said dispenser area and closed off at the rear and sides thereof.

12. In the combination of claim 1 including a carafe on said plate, said carafe having a top lid with a filter disposed in an opening in said top lid.

13. In the combination of claim 12 wherein said filter is loosely disposed in the opening in said top lid so that it can be removed therefrom without the need of oepning said top lid.

14. In the combination of claim 12 wherein a handle is fixed to one side of said carafe and a spout is provided on the other side of said carafe, said carafe lid being hingedly secured thereto.

15. In the combination of claim 12 wherein said opening in said carafe lid is elongated, said filter also being elongated in cross-section and conforming to the opening in said carafe lid.

16. In the combination of claim 15 wherein said filter includes a trough-shaped upper portion opening to the opening in said dispenser area and substantially as long as the opening in said dispenser area, said filter further including a pair of spaced side walls extending downwardly from said trough-shaped upper portion and a permanent filter mesh fixed in said filter between said side walls.

17. In the combination of claim 1 including a water expansion chamber in said housing below said dispenser area in fluid communication with said spout and said opening in said side wall, said expansion chamber including a ramp leading from said water tank to said a point below said dispenser area and closed off at the rear and sides thereof, a carafe on said plate, said carafe having a top lid with a filter disposed in an opening in said top lid, and said filter having an upper trough-shaped portion forming a peripheral lip, said ramp having a downwardly extending flange thereon adapted to be engaging by said filter lip for indexing the filter to the ramp for alignment therewith.

* * * * *